United States Patent [19]

Stephens, Jr. et al.

[11] Patent Number: 4,536,396

[45] Date of Patent: Aug. 20, 1985

[54] SYNERGISTIC SWEETENING COMPOSITIONS

[75] Inventors: Charles R. Stephens, Jr., Niantic; Anibal Torres, Waterford, both of Conn.

[73] Assignee: Pfizer Inc., New York, N.Y.

[21] Appl. No.: 529,801

[22] Filed: Sep. 6, 1983

[51] Int. Cl.³ .................... A61K 37/02; A61K 9/68; A23L 1/236; A23G 3/30

[52] U.S. Cl. ........................................ 514/2; 424/48; 426/548; 426/3

[58] Field of Search .................. 426/548, 3; 424/177, 424/48

[56] References Cited

U.S. PATENT DOCUMENTS 3,689,486  9/1972  Clauss et al. .................... 260/243 R
4,411,925  10/1983  Brennan et al. .............. 260/112.5 R

FOREIGN PATENT DOCUMENTS 0069811  1/1983  European Pat. Off. ............ 426/548

OTHER PUBLICATIONS

Beverage World, pp. 46–48, Apr. 1983.
Clauss et al., Angew Chemie International Edition 12, pp. 869–875, (1973).

*Primary Examiner*—Delbert R. Phillips
*Assistant Examiner*—F. T. Moezie
*Attorney, Agent, or Firm*—Charles J. Knuth; Albert E. Frost; Robert K. Blackwood

[57] ABSTRACT

Combination of 6-methyl-1,2,3-oxathiazin-4(3H)-one-2,2-dioxide (acesulfame) with 3-(L-aspartyl-D-alaninamido)-2,2,4,4-tetramethylthietane masks the bitter taste of the oxathiazine and at the same time provides synergistic sweetness over a range of concentrations.

22 Claims, No Drawings

SYNERGISTIC SWEETENING COMPOSITIONS

BACKGROUND OF THE INVENTION

6-Methyl-1,2,3-oxathiazin-4(3H)-one-2,2-dioxide (or an edible cationic salt thereof), conveniently used in the form of its potassium salt (generic name: acesulfame potassium salt), of the formula

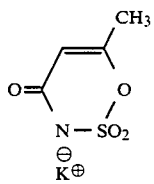

in combination with 3-(L-aspartyl-D-alaninamido)-2,2,4,4-tetramethylthietane, or 3-(L-aspartyl-D-serinamido)-2,2,4,4-tetramethylthietane, of the formula

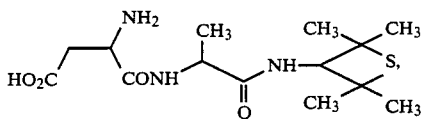

or an edible salt thereof, provides a combination wherein the bitter aftertaste of acesulfame is masked. At the same time, over a range of concentrations, the combination demonstrates synergism whereby the sweetening power of the combination is greater than its component parts.

Acesulfame, including its potassium salt (hereinafter abbreviated as AS-K), has been described by Clauss et al., U.S. Pat. No. 3,689,486 (1972), as an artificial sweetening agent having a sweetness of 130 relative to cane sugar in water at concentrations equivalent in sweetness to a 4% solution of said cane sugar. Such solutions were further indicated to be free of objectionable bitter taste at the *specified* concentration (0.031%) equivalent to 4% cane sugar [Clauss et al., Angew. Chemie. Inter. Ed. in English 12 (11), pp. 869–876 (1973)]. However, at concentrations equivalent to 6–10% sucrose, the relative sweetness of AS-K is about 90 or less. Moreover, at concentrations above 6% sucrose equivalent, the bitter chemical taste of AS-K becomes objectionable. Thus its use in edible foods and beverages, in oral hygienic products and in medicinal agents formulated for oral use is greatly limited, since concentrations equivalent to the sweetness of 10% sucrose or better are frequently desirable in such uses.

3-(L-Aspartyl-D-alaninamido)-2,2,4,4-tetramethylthietane, hereinafter called CP-54,802, has been described as a synthetic sweetening agent in European Patent Document No. 34,876, published in 1981. The isolation and purification of this compound in the form of various of its aromatic sulfonate salts has also been described by Sklavounos, U.S. Pat. No. 4,375,430 (March, 1983).

Subsequent to our invention, there has been a new report, unsupported by scientific data, that AS-K is synergistic with aspartame (the methyl ester of L-aspartyl-L-phenylalanine); see Beverage World, April 1983, page 48. There are no known reports concerning the bitter aftertaste of AS-K at higher concentrations, or of methods to overcome that bitter aftertaste.

SUMMARY OF THE INVENTION

The present invention encompasses a method of masking the bitter taste and enhancing the sweet taste of 6-methyl-1,2,3-oxathiazin-4(3H)-one-2,2-dioxide, or an edible cationic salt thereof, in a composition for oral use which comprises combining in said composition 0.5 to 20 parts by weight of 3-(L-aspartyl-D-alanamido)-2,2,4,4-tetramethylthietane or an edible salt thereof for each 99.5 to 80 parts by weight of said oxathiazine or salt thereof, the sum of the parts by weight equalling 100, in total amounts which produce the desired sweetness in said composition, as hereinafter defined.

The present invention also encompasses such artificially sweetened oral compositions, and a composition suitable for use in the manufacture of such oral compositions.

Conveniently, acesulfame is used as its potassium salt (AS-K), and CP-54,802 in free base form, but it will be understood by those skilled in the art that alternative cationic or acid addition salt forms of these substances can be used, and that the actual form of acesulfame and CP-54,802 in a composition for oral will be dependent upon the pH of the composition and the nature of the cationic and anionic substances present therein.

The present method is particularly valuable when a concentration of sweetening agent equivalent to 6% sucrose or higher is required. Such compositions for oral use include, but are not limited to, foods or beverages (e.g., a gelatin dessert or pudding, or dry-mix therefor, a confection or chewing gum, a flavored carbonated drink, a fruit flavored non-carbonated drink or dry-mix therefor, a canned or preserved fruit or fruit juice, or a baked product such as a cake or cookie), a solution or dry powder for use as a table sweetener (i.e. for sweetening edible foods and beverages at the point of consumption), oral hygienic products (such as mouth wash, tooth paste and tooth powder) and formulated medicinal agents (particularly solutions or suspensions for pediatric use).

DETAILED DESCRIPTION OF THE INVENTION

The relative sweetness intensity and quality of CP-54,802, AS-K and mixtures of CP-54,802 and AS-K were determined by sensory analysis. These determinations were carried out in a facility designed for controlled tasting, flavor research and evaluation of food additives, including a separate preparation room and individual tasting booths with complete air-conditioning, controlled lighting, running water and a sink for expectoration.

Aqueous solutions of sucrose were prepared at concentrations (w/w) of 2, 3, 4, 5, 6, 7, 8, 9, 10, 11 and 12% along with a sample of one of the test compounds at the levels specified in the test experiments. A beaker containing a solution of the test compound identified only by a coded digit was submitted to the taster by a co-worker along with a beaker containing the above sucrose solutions. The sweetness intensity of the test compound was compared with one or more of the sucrose control solutions to determine whether that particular sucrose reference sample was of lesser, greater or equal sweetness. The taste quality of the test sample was then characterized by comparison with the sucrose solution. In some instances a reference aqueous solution containing either CP-54,802 and/or AS-K alone was also used to characterize the taste quality of mixture of CP-54,802 and AS-K.

According to the procedure detailed above, a sample of AS-K was carefully reevaluated, confirming its high equivalence to sucrose and lack of bitter aftertaste at concentrations equivalent to less than 6% sucrose. After selecting the particular sucrose solution equal in sweetness to the AS-K solution, subsequent test comparisons of the AS-K and sucrose solution at closest sweetness intensity were performed to recheck the intensity value and to characterize the taste quality of the AS-K. By this means, the following results were obtained:

| Concentration Sucrose % | Equivalent Concentration AS-K % | AS-K Potency Sucrose = 1 |
|---|---|---|
| 2 | 0.0080 | 250 |
| 3 | 0.0150 | 200 |
| 4 | 0.0250 | 160 |
| 5 | 0.0455 | 110 |
| 6 | 0.0667 | 90 |
| 7 | 0.0777 | 90 |
| 8 | 0.0889 | 90 |
| 9 | 0.1059 | 85 |
| 10 | 0.1250 | 80 |

We have further determined that AS-K solutions exhibit an undesirable bitter taste quality at concentrations above a concentration equal in sweetness to 6% sucrose. This made the estimation of its relative sweetness difficult to assess, such that the given potency values above 6% sucrose equivalents can only be approximate.

When tested in like manner, CP-54,802 demonstrated a more nearly linear relationship between concentration and sucrose equivalence:

| Concentration Sucrose % | Equivalent Concentration CP-54,802 % | CP-54,802 Potency Sucrose = 1 |
|---|---|---|
| 2 | 0.00069 | 2,900 |
| 3 | 0.00105 | 2,850 |
| 4 | 0.00143 | 2,800 |
| 5 | 0.00200 | 2,500 |
| 6 | 0.00260 | 2,300 |
| 7 | 0.00310 | 2,250 |
| 8 | 0.00378 | 2,112 |
| 9 | 0.00430 | 2,075 |
| 10 | 0.00500 | 2,000 |

All the solutions exhibited a clean, sugar-like taste quality with a slightly slow onset of sweetness.

By these methods, the enhanced sweetness potency and the reduced AS-K bitter aftertaste found in combinations of AS-K with CP-54,802 were determined. Test results are summarized in Table I.

TABLE I

Sweetness Potency and Taste Quality of Mixtures of CP-54,802 and Acesulfame K Containing 0.5% to 20% CP-54,802 When Compared to 10% Sucrose in Water

| % Composition CP-54,802/AS-K | Concentration (g/100 ml) ≡ 10% Sucrose | Potency of Mixture | Predicted Potency[a] | % Synergism | Taste Quality |
|---|---|---|---|---|---|
| 0/100 | 0.1250 | 80 | — | — | Sweet, followed by a moderate to strong bitter metallic note, followd by a sweet and bitter lingering taste. |
| 0.5/99.5 | 0.0877 | 114 | 104 (2950/90) | 9 | Sweet, followed by a slight-moderate bitter note, followed by sweetness. Bitterness has a clean cutoff. |
| 1/99 | 0.0775 | 129 | 118 (2890/90) | 9 | Sweet, followed by a slight bitter note, followed by sweetness. Bitterness has a clean cutoff. The degree of bitterness is in the slight magnitude. |
| 2/98 | 0.0538 | 186 | 153 (2850/100) | 21 | Sweet, followed by a slight bitter note, followed by sweetness. Bitterness has a clean cutoff. The degree of bitterness is in the perceptible-slight magnitude. |
| 4/96 | 0.0398 | 251 | 228 (2700/125) | 10 | Sweet, followed by a very slight bitter note, followed by sweetness. Bitterness has a clean cutoff. The degree of bitterness is in the perceptible magnitude. |
| 6/94 | 0.0305 | 328 | 295 (2575/150) | 11 | Clean sweet taste of sugar. No trace of bitterness. |
| 8/92 | 0.0235 | 425 | 358 (2725/170) | 19 | Clean sweet taste of sugar. No trace of bitterness. |
| 10/90 | 0.0200 | 500 | 436 (2500/185) | 15 | Clean sweet taste of sugar. Slow onset sweetness perception. |
| 12/88 | 0.0174 | 574 | 473 (2475/200) | 21 | Clean sweet taste of sugar. Slow onset sweetness perception. |
| 14/86 | 0.0152 | 654 | 529 (2460/215) | 24 | Clean sweet taste of sugar. Slow onset sweetness perception. |
| 16/84 | 0.0143 | 700 | 573 (2400/225) | 22 | Clean sweet taste of sugar. Slow onset sweetness perception. |
| 18/82 | 0.0137 | 729 | 611 (2350/230) | 19 | Clean sweet taste of sugar. Slow onset sweetness perception. |
| 20/80 | 0.0133 | 751 | 643 | 17 | Clean sweet taste of sugar. Slow |

TABLE I-continued

Sweetness Potency and Taste Quality of Mixtures of CP-54,802 and Acesulfame K
Containing 0.5% to 20% CP-54,802 When Compared to 10% Sucrose in Water

| % Composition CP-54,802/ AS-K | Concentration (g/100 ml) ≡ 10% Sucrose | Potency of Mixture | Predicted Potency[a] | % Synergism | Taste Quality |
|---|---|---|---|---|---|
| | | (2275/235) | | | onset sweetness perception. |

[a]Predicted potency =

$$\left( \frac{\% \text{ CP-54,802}}{100} \times \text{Potency at concentration of CP-54,802} \right) + \left( \frac{\% \text{ AS-K}}{100} \times \text{Potency at concentration of AS-K} \right)$$

The potency at various concentrations of (CP-54,802/AS-K) is shown in parenthesis. It was determined by interpolation of the data herein showing potency versus concentration for each component.

The combinations of the present invention provide advantageous sweetening agents, in view of their high potency, their physical form and stability, and lack of harsh or bitter aftertaste at ordinary use levels. The components of the combinations can be employed separately—in solid forms such as powders, tablets, granules and dragees; and liquid forms such as solutions, suspensions, syrups, emulsions as well as other commonly employed forms particularly suited for combination with edible or pharmaceutical materials. These forms can consist of each individual component, alone, or in association with non-toxic sweetening agent carriers, i.e. non-toxic substances commonly employed in association with sweetening agents. Such suitable carriers include water, sorbitol, mannitol, vegetable or mineral oils, corn syrup solids, lactose, cellulose, starch, dextrins, modified starches, polysaccharides such as polydextrose (see, e.g. U.S. Pat. No. 3,766,165 and U.S. Pat. No. 3,876,794), calcium phosphate (mono-, di- or tri-basic) and calcium sulfate.

Alternatively, particularly for use as a table sweetener or in the manufacture of edible or pharmaceutical materials, the components of the combinations are pre-blended and then used in solid or liquid forms as detailed in the preceding paragraph.

The ultimate compositions for edible use, or for use as oral hygienic products or as formulated medicinal agents, are readily prepared, using methods generally known in the food technology and pharmaceutical arts. The taste quality of such typically prepared edible products prepared with sucrose, with AS-K alone and with one of present combinations as sweetening agent are summarized in Table III.

TABLE III

Taste Quality of Various Edible Products Sweetened with Sucrose, AS-K Alone or a Combination of AS-K with CP-54,802

| Edible Product | Sweetening Agent | Use Level of Agent in Product as Consumed (%) | Potency of Sweetening Agent in Product | Taste Quality |
|---|---|---|---|---|
| Vanilla frozen dessert | Sucrose | 15 | (1) | Very good clean sweet taste quality. |
| | AS-K | 0.167 | <90 | Significantly less sweet than sucrose and CP-54,802/AS-K mixture. Product exhibited a moderate intensity of bitterness. |
| | 8% CP-54,802 92% AS-K | 0.033 | 455 | Comparable in quality and sweetness intensity to the sucrose dessert. |
| Peppermint hard candy | Sucrose | 97 | (1) | Very good clean sweet taste quality. |
| | AS-K | 1.07 | <90 | Significantly less sweet than sucrose and CP-54,802/AS-K mixture. Candy displayed a moderate intensity of bitterness. |
| | 6% CP-54,802 94% AS-K | 0.298 | 326 | Good sweetness impact with perceptible bitter notes. |
| Vanilla cakes | Sucrose | 30 | (1) | Very good clean sweet taste quality. |
| | AS-K | 0.330 | 90 | Sweet with pronounced bitterness. |
| | 6% CP-54,802 94% AS-K | 0.100 | 300 | Good sweetness impact with perceptible bitter notes. |
| Vanilla pudding | Sucrose | 14.2 | (1) | Very good clean sweet taste quality. |
| | AS-K | 0.156 | <90 | Not as sweet as the sucrose and CP-54,802/AS-K mixtures. Pudding was judged to have a moderate to pronounced bitterness. |
| | 1% CP-54,802 99% AS-K | 0.110 | 129 | Sweet with perceptible to slight bitterness. |
| | 4% CP-54,802 96% AS-K | 0.056 | 254 | Good sweetness impact, with a sugar-like quality. |
| | 8% CP-54,802 92% AS-K | 0.033 | 430 | Comparable in quality to the sucrose pudding. |
| | 12% CP-54,802 88% AS-K | 0.024 | 592 | Comparable in quality to the sucrose pudding. |
| | 16% CP-54,802 84% AS-K | 0.019 | 747 | Comparable in quality to the sucrose pudding. |
| | 20% CP-54,802 80% AS-K | 0.015 | 947 | Comparable in quality to the sucrose pudding. |

TABLE III-continued

Taste Quality of Various Edible Products Sweetened with
Sucrose, AS-K Alone or a Combination of AS-K with CP-54,802

| Edible Product | Sweetening Agent | Use Level of Agent in Product as Consumed (%) | Potency of Sweetening Agent in Product | Taste Quality |
|---|---|---|---|---|
| Lemonade drink | Sucrose | 7.4 | (1) | Very good clean sweet taste quality. |
| | AS-K | 0.082 | <90 | Less sweet than the sucrose and CP-54,802/AS-K mixtures. Drink displayed a moderate bitter taste quality. |
| | 6% CP-54,802 94% AS-K | 0.023 | 322 | Sweet with perceptible/slight bitterness. |
| | 8% CP-54,802 92% AS-K | 0.018 | 411 | Sweet with perceptible bitterness. |
| | 10% CP-54,802 90% AS-K | 0.015 | 493 | Good sweetness impact with a sugar-like quality. |
| | 14% CP-54,802 86% AS-K | 0.011 | 673 | Comparable in quality to the sucrose lemonade. |
| 7-Up-type carbonated drink | Sucrose | 11.0 | (1) | Very good clean sweet taste quality. |
| | AS-K | 0.121 | <90 | Not as sweet as the sucrose and CP-54,802/AS-K blends. Sample exhibited slight to moderate bitterness. |
| | 2% CP-54,802 98% AS-K | 0.059 | 186 | Good sweetness impact with a sugar-like taste (i.e. free of bitterness). |
| | 4% CP-54,802 96% AS-K | 0.044 | 250 | Comparable in quality to the sucrose beverage. |
| Cola carbonated drink | Sucrose | 12.0 | (1) | Very good clean sweet taste quality. |
| | AS-K | 0.133 | 90 | Not as sweet as the sucrose and CP-54,802/AS-K mixtures. Sample displayed a slight to moderate bitterness. |
| | 1% CP-54,802 99% AS-K | 0.100 | 120 | Sweet with a perceptible bitter taste quality. |
| | 2% CP-54,802 98% AS-K | 0.065 | 184 | Good sweetness impact, with a sugar-like quality. |
| | 4% CP-54,802 96% AS-K | 0.048 | 251 | Comparable in quality to the sucrose beverage. |
| | 6% CP-54,802 94% AS-K | 0.032 | 324 | Similar taste as the mixture containing 4% CP-54, 802. |
| Strawberry drink | Sucrose | 10.0 | (1) | Very good clean sweet taste quality. |
| | AS-K | 0.111 | <90 | Not as sweet as the sucrose and CP-54,802/AS-K blends. Drink elicited a moderate to pronounced bitterness. |
| | 1% CP-54,802 99% AS-K | 0.083 | 120 | Sweet with perceptible to slight bitterness. |
| | 4% CP-54,802 96% AS-K | 0.040 | 250 | Sweet with perceptible bitter notes. |
| | 6% CP-54,802 94% AS-K | 0.030 | 333 | Good sweetness impact, with a sugar-like quality. |
| Orange gelatin dessert | — | 14.0 | (1) | Very good clean sweet taste quality. |
| | — | 0.156 | <90 | Slightly less sweet than the sucrose and CP-54,802/AS-K mixtures. Product exhibited moderate bitter notes. |
| | 4% CP-54,802 96% AS-K | 0.056 | 250 | Sweet with perceptible to slight bitterness. |
| | 6% CP-54,802 94% AS-K | 0.043 | 325 | Good sweetness impact with a sugar-like quality. |
| | 8% CP-54,802 92% AS-K | 0.033 | 424 | Comparable in quality to the sucrose gelatin. |

The following Examples are illustrative. However, it should be understood that the invention is not limited to the specific details of these Examples.

EXAMPLE 1

Chewing Gum

Chewing gums were prepared using either corn syrup and confectionary sugar (sucrose) or a mixture containing 10% CP-54,802 and 90% AS-K as the sweetener components. The following ingredients and method were used.

| Chewing Gum No. Ingredients | (1)(Control) Weight % | (2) Weight % |
|---|---|---|
| Gum base (Paloja) | 20.00 | 20.00 |
| Confectionary sugar | 56.86 | — |
| Corn syrup (80% soluble solids) | 19.93 | — |
| Polydextrose | — | 36.22 |
| Sodium bicarbonate | — | 0.36 |
| Crystalline sorbitol | — | 36.12 |
| Water | — | 3.99 |
| CP-54,802 | — | 0.01 |
| AS-K | — | 0.09 |
| Glycerin | 0.61 | 0.61 |
| Peppermint oil | 0.60 | 0.60 |

| Chewing Gum No. Ingredients | (1)(Control) Weight % | (2) Weight % |
|---|---|---|
| Confectionary sugar for dusting | 2.00 | — |
| Mannitol for dusting | — | 2.00 |
| | 100.00 | 100.00 |

Procedures:
(1) Sugar Chewing Gum. The gum base was ground to 150–250 microns. Confectionary sugar was added with thorough mixing, the mixture transferred to a stainless steel beaker, placed in an oil bath (set at 80° C.) and allowed to soften while stirring at 250 rpm. The corn syrup was added and stirring continued for 10 minutes to obtain a homogeneous mixture. The glycerin and peppermint oil were combined and added with stirring to the molten gum/sugar mixture and again stirred for 10–12 minutes to obtain a homogeneous mix. The chewing gum mass was transferred onto a marble slab which had been dusted with confectionary sugar, introducing some of the dusting sugar to the mass, and kneaded, until a smooth non-sticky and non-stringy mass was obtained. The mass was flattened to 1/16 inch thickness, cut into the desired size and wrapped.
(2) Artificially Sweetened Chewing Gum. Same procedure as 1, except prior to the gum preparation the polydextrose, sodium bicarbonate and sorbitol were premixed and micronized in a mill to about 10 micron particle size. The resulting microfine mixture was added to the gum in the same manner as the confectionary sugar. Furthermore, the CP-54,802 and AS-K mixture was dissolved in water and combined with glycerin and peppermint oil, and the mannitol was used for dusting powder in place of the confectionary sugar in the dusting step.

Taste comparison of the two chewing gums indicated them to be essentially equivalent in sweetness intensity, texture, color and other overall flavor characteristics. Based on these results the mixture containing 10% CP-54,802 and 90% AS-K exhibited a sweetness potency of approximately 500 times that of confectionary sugar.

EXAMPLE 2

Chewing Gum

A synthetically sweetened chewing gum was prepared according to the preceding Example, utilizing 0.19% of a blend composed of 4% CP-54,802 and 96% AS-K in place of the 0.1% of the mixture containing 10% CP-54,802 and 90% AS-K. When compared to the control chewing gum of the preceding Example, the resultant product displayed sweetness intensity and quality similar to the sugar control. Based on this observation the 4% CP-54,802 and 96% AS-K mixture provided a sweetness potency of about 250 times that of sugar.

EXAMPLE 3

Table Sweetener (Solid)

A table sweetener containing a mixture of 0.5% CP-54,802 and 99.5% of AS-K was prepared according to the following ingredients proportion and directions:

| Ingredients | Weight % |
|---|---|
| CP-54,802 | 0.05 |
| AS-K | 9.95 |
| Hydrolyzed cereal solid 5DE | 90.00 |
| | 100.00 |

A 0.44 gram portion of this composition provided sweetness equivalent to a teaspoon of sucrose (i.e. 5 grams).

EXAMPLE 4

Table Sweetener (Liquid)

A table sweetener in a liquid form containing a blend of 12% CP-54,802 and 88% AS-K was prepared as follows:

| Ingredients | Weight % |
|---|---|
| CP-54,802 | 0.02 |
| AS-K | 0.15 |
| Sodium benzoate | 0.10 |
| Water | 99.73 |
| | 100.00 |

A teaspoon (5 grams) of this table sweetener gave sweetness comparable to 5 grams (a teaspoon) of granulated sugar.

EXAMPLE 5

Pancake Syrup

The following pancake syrup compositions were found functionally equivalent from the standpoint of sweetness intensity and quality.

| Ingredients | Weight % | Weight % |
|---|---|---|
| Sucrose | 50.00 | — |
| Polydextrose | — | 50.00 |
| Sodium bicarbonate | — | 0.50 |
| Artificial sweetener mixture composed of 8% CP-54,802 and 92% AS-K | — | 0.12 |
| Water | 49.62 | 49.00 |
| Sodium benzoate | 0.10 | 0.10 |
| Maple flavor | 0.10 | 0.10 |
| Acid proof caramel color 10% aqueous solution | 0.18 | 0.18 |
| | 100.00 | 100.00 |

EXAMPLE 6

Canned Peaches

Fresh peaches were washed, peeled, pitted and sliced and then immersed in an aqueous solution containing 0.05% ascorbic acid to prevent oxidase darkening. The sliced peaches were packed into ½ pint screw cap jars and filled to the top with a syrup containing 20% polydextrose, 0.077% of a blend containing 14% CP-54,802 and 86% AS-K and 0.1% citric acid. The jars were subsequently capped loosely and placed in a home canning autoclave containing hot water (approximately 1.5 inches below tops of jars) and heated at 100° C. for 45 minutes. The jars were removed and immediately sealed by tightening caps and allowed to cool by immersing in cold water.

Sensory evaluations indicated the canned peaches to be comparable in sweetness intensity and quality to similar canned peaches containing 50% sucrose.

EXAMPLE 7

Strawberry Preserve

The following dietetic strawberry preserve containing a mixture of 20% CP-54,802 and 80% AS-K was found to be comparable in sweetness intensity to a similar preserve containing 48% sucrose.

| Ingredients | Weight % |
| --- | --- |
| Polydextrose | 40.130 |
| Sodium bicarbonate | 0.400 |
| Water | 17.380 |
| Low methoxyl pectin | 1.290 |
| Calcium chloride 10% aqueous solution | 0.690 |
| Strawberry fruit | 34.500 |
| Citric acid 50% aqueous solution | 1.120 |
| CP-54,802 \} Combine and | 0.013 |
| AS-K \} dissolve solids | 0.051 |
| Water \} in water | 4.426 |
| | 100.000 |

Procedure:

The polydextrose, sodium bicarbonate water and pectin were combined. The mixture was slowly heated with stirring to the boiling point (105° C.) and, with good agitation, the calcium chloride solution was added. The mixture was reheated to 105° C., the strawberry fruit added and heating continued with stirring (to prevent scorching) until a temperature of 104°–105° C. was reached. The mixture was removed from heat, the acid and artificial sweeteners solution were added with thorough mixing, and the preserve allowed to cool to 80°–90° C. It was transferred to jars, tightly capped and cooled to ambient temperature for storage.

EXAMPLE 8

Vanilla Cake

A typical control cake (1) was prepared using the following ingredients and procedure:

| Ingredients | Weight % |
| --- | --- |
| Emulsified shortening | 15.71 |
| Non-fat milk solids | 1.63 |
| Sugar (sucrose) | 27.78 |
| Whole eggs (beaten) | 11.44 |
| Water | 14.91 |
| Cake flour | 27.82 |
| Sodium bicarbonate | 0.19 |
| Glucono delta lactone | 0.38 |
| Vanilla extract | 0.14 |
| | 100.00 |

Procedure:

In an electric home mixer bowl, the shortening, non-fat milk solids and sugar were creamed at low speed for 3 minutes. The eggs were added and the mixture was beaten for 2 minutes. The water and vanilla extract were combined and added to the above, and the resulting mixture was mixed for 2–3 minutes until a homogeneous creamy slurry was obtained. Meanwhile the cake flour, sodium bicarbonate and glucono delta lactone were premixed and added to the other hydrated ingredients. The resulting mixture was mixed 2–3 minutes until a batter of smooth and creamy consistency was obtained. A portion of this batter (450 grams) was poured into a 8×1.5 inch lightly greased round cake pan, and then baked at 177° C. for 30 minutes.

A synthetically sweetened cake (2) was prepared in which all the sucrose was replaced by an equal weight of polydextrose, a non-caloric and non-sweet water soluble sugar replacement. A mixture containing 6% CP-54,802 and 94% AS-K was used to provide the sweetness to the cake. The ingredients used were as follows:

| Ingredients | Weight % |
| --- | --- |
| Emulsified shortening | 15.100 |
| Non-fat milk solids | 1.630 |
| Whole eggs (beaten) | 11.440 |
| Polydextrose | 27.683 |
| CP-54,802 | 0.006 |
| AS-K | 0.091 |
| Water | 15.000 |
| Cake flour | 27.510 |
| Sodium bicarbonate | 0.540 |
| Glucono delta lactone | 0.860 |
| Vanilla extract | 0.140 |
| | 100.000 |

The procedure for making cake (2) was the same as for the control, except the AS-K and CP-54,802 were dissolved in the water prior to combining with the vanilla and adding to the mixture.

Taste comparison of the resulting cakes indicated them to display essentially equivalent sweetness intensity and quality as judged by texture, color, and other general physical attributes.

EXAMPLE 9

Hard Candies

Mint flavored sugarless hard candies were made by replacing 100% of the sugar in a standard recipe with polydextrose and a mixture containing 6% CP-54,802 and 94% AS-K, using the following proportions of ingredients and according to the direction given below.

| Ingredients | Percent | Part |
| --- | --- | --- |
| Polydextrose | 68.590 | A |
| Water | 28.320 | |
| Sodium bicarbonate | 1.030 | B |
| Titanium dioxide | 0.490 | |
| FD & C mint color, 10% solution[1] | 0.060 | |
| Water | 0.500 | |
| Artificial sweetener mixture containing 6% CP-54,802 and 94% AS-K | 0.196 | C |
| Water | 0.800 | |
| Peppermint flavor #US 48994[2] | 0.007 | |
| Spearmint flavor #H 6174,[2] 25% solution in propylene glycol | 0.007 | |
| | 100.000 | |

[1]75 parts of FD & C yellow #5, 10% solution, 25 parts of FD & C blue #1, 10% solution.
[2]Haarmann and Reimer Corporation.

Procedure:
1. Prepare a large stock each of part B and C mixtures, respectively, and set aside.
2. Add polydextrose to water, and heat while stirring until dissolved. Heat to 140°–145° C. at atmospheric pressure.
3. Remove from heat, and add pre-blended ingredients of part B with good stirring until mass puffs up and ingredients are mixed uniformly.
4. Introduce pre-blended ingredients of part C with good stirring.
5. Pour into molds or stamp using conventional laboratory candy equipment.

We claim:

1. A method of masking the bitter taste and enhancing the sweet taste of 6-methyl-1,2,3-oxathiazin-4(3H)-one-2,2-dioxide, or an edible cationic salt thereof, in a composition for oral use which comprises combining in said composition 0.5 to 20 parts by weight of 3-(L-aspartyl-D-alanamido)-2,2,4,4-tetramethylthietane or an edible salt thereof for each 99.5 to 80 parts by weight of said oxathiazine or salt thereof, the sum of the parts by weight equalling 100, in total amounts which produce the desired sweetness in said composition.

2. A method of claim 1 wherein said composition for oral use is an edible food or beverage.

3. A method of claim 2 wherein the edible food is a gelatin dessert or a pudding, or a dry mix therefor.

4. A method of claim 2 wherein the edible food is a confection or chewing gum.

5. A method of claim 2 wherein the edible food or beverage is a flavored carbonated drink.

6. A method of claim 2 wherein the edible food or beverage is a non-carbonated fruit flavored drink, or dry mix therefor.

7. A method of claim 2 wherein the food or beverage is a canned or preserved fruit or fruit juice.

8. A method of claim 2 wherein the edible food is a cake, cookie or other baked product.

9. A method of claim 2 wherein the composition for oral use is a liquid or dry powder for use as a table sweetener.

10. A method of claim 1 wherein the composition for oral use is an oral hygienic product.

11. A method of claim 1 wherein the composition for oral use is a formulated medicinal agent.

12. An artificially sweetened composition for oral use which comprises 0.5 to 20 parts by weight of 3-(L-aspartyl-D-alaninamido)-2,2,4,4-tetramethylthietane or an edible salt thereof and 80 to 99.5 parts by weight of 6-methyl-1,2,3-oxathiazine-4(3H)-one-2,2-dioxide or an edible cationic salt thereof, the sum of the parts by weight equalling 100, in total amounts which produce the desired sweetness in said composition.

13. A composition of claim 12 which is an edible food or beverage.

14. A composition of claim 13 wherein the edible food is a gelatin dessert or a pudding, or a dry mix therefor.

15. A composition of claim 13 wherein the edible food is a confection or chewing gum.

16. A composition of claim 13 wherein the edible food or beverage is a flavored carbonated drink.

17. A composition of claim 13 wherein the edible food or beverage is a non-carbonated fruit flavored drink, or dry mix therefor.

18. A composition of claim 13 wherein the food or beverage is a canned or preserved fruit or fruit juice.

19. A composition of claim 13 wherein the edible food is a cake, cookie or other baked product.

20. A composition of claim 12 which is a liquid or dry powder suitable for use as a table sweetener.

21. A composition of claim 12 which is an oral hygienic product.

22. A composition of claim 12 which is a formulated medicinal agent.

* * * * *